United States Patent [19]

Cuneo

[11] Patent Number: 4,503,370
[45] Date of Patent: Mar. 5, 1985

[54] ELECTRONIC CLUTCH FOR ELECTRIC TOOLS OF SELECTABLE SPEED

[75] Inventor: Guiseppe Cuneo, Calolziocorte, Italy

[73] Assignee: Black & Decker Inc., Newark, Del.

[21] Appl. No.: 541,695

[22] Filed: Oct. 13, 1983

[30] Foreign Application Priority Data

Oct. 26, 1982 [IT] Italy .............................. 23931 A/82

[51] Int. Cl.³ .............................................. G05B 5/00
[52] U.S. Cl. ............................... 318/331; 318/345 D; 318/345 H
[58] Field of Search ............... 173/5, 7, 12; 310/50; 361/88, 89, 23, 24, 28, 29, 30, 31, 33, 100, 78, 86; 318/434, 345 R, 305, 445, 447, 458, 358, 345 G, 345 H, 345 D, 329, 341

[56] References Cited
U.S. PATENT DOCUMENTS

| | | | |
|---|---|---|---|
| 3,953,776 | 4/1976 | Wolf ........................................ | 318/312 |
| 4,064,443 | 12/1977 | Yamada et al. ........................ | 318/331 |
| 4,241,299 | 12/1980 | Bertone .............................. | 318/331 X |
| 4,291,259 | 9/1981 | Marumoto et al. ................. | 318/341 X |
| 4,322,667 | 3/1982 | Ohba ................................. | 318/341 X |
| 4,384,241 | 5/1983 | Stillhard ........................... | 318/331 X |
| 4,413,213 | 11/1983 | Banmagarten ..................... | 361/30 X |

Primary Examiner—Ulysses Weldon
Attorney, Agent, or Firm—Ronald B. Sherer; Edward D. Murphy; Harold Weinstein

[57] ABSTRACT

An electronic clutch for a multispeed electric tool includes a voltage sensor having a D.C. voltage output proportional to the current absorbed by the tool's motor and dependent on the motor operating temperature. A comparator compares this D.C. voltage with a suitably generated reference voltage, and if the former exceeds the latter it blocks the oscillation of an oscillator which via a power circuit controls a triac provided in the motor power supply circuit. Blocking the oscillator causes the deactivation of the triac, and thus stops the motor. The proportionality constant of the D.C. voltage, or that of the reference voltage, can be varied as a function of the tool operating speed. For this purpose, the voltage sensor or, respectively, the reference voltage generator includes a voltage divider in which resistors are provided which can be cut in or out by means of electric contacts controlled by the tool's speed change mechanism.

5 Claims, 2 Drawing Figures

ELECTRONIC CLUTCH FOR ELECTRIC TOOLS OF SELECTABLE SPEED

FIELD OF THE INVENTION

This invention relates to an electronic clutch with several levels of operation for electric tools of selectable speed. The invention particularly relates to improved electronic clutches for portable electric tools having two or more selectable speeds.

BACKGROUND OF THE INVENTION

The term "electronic clutch" normally means a device able to automatically halt the power supply to the tool drive motor whenever the torque applied to the motor armature shaft exceeds a predetermined maximum value.

Currently used electronic clutches are based on electronic devices, known as klixons, which operate when the current absorbed by the tool exceeds a certain operating threshold (klixon opening current). This operation threshold can vary by as much as 20%, and depends on the tolerances of the devices used.

There is a tendency to provide electric tools, and in particular drilling machines, with two or more operating speeds, for which there should correspond two operating levels of the electronic clutch. An electronic clutch with two or more operating levels, if based on current klixon devices, would however require the use of a number of such devices, and a corresponding number of selection switches equal to the number of operating levels, resulting in a high tool cost.

SUMMARY OF THE INVENTION

The object of the present invention is to provide an electronic clutch for electric tools of selectable speed, which provides several levels of operation in accordance with the various operating speeds, without this leading to particular structural complications or manufacturing costs.

According to the present invention there is provided an electronic clutch for an electronic tool having a motor speed change device for selecting different speeds of operation, characterised by comprising a voltage sensor able to generate a voltage proportional to the current absorbed by the tool motor, a reference voltage generator, a comparator arranged to compare said voltages with each other, an electronic circuit arranged to halt the power supply to the motor when the comparator indicates that said voltage generated by the sensor exceeds said reference voltage, and means for proportionally varying the one or other of said voltages in accordance with the operating speed chosed for the tool.

Without multiplying the required circuits, but by simply adjusting the proportionality constant of the voltage sensor or the value of the reference voltage, for example by means of a voltage divider comprising a plurality of resistors which can be cut in or out by means of electric contacts controlled by the tools speed change device, it is thus possible to provide the electronic clutch with two or more levels of operation in accordance with the various selectable operating speeds.

It should also be noted that as the voltage sensor generates a voltage proportional to the current and to the tool temperature, the electronic clutch is able to automatically adapt to the motor temperature so as to operate at lower values when the temperature rises and vice versa.

Other objects, features and advantages of the present invention will become more fully apparent from the following detailed description of the preferred embodiments, the appended claims and the accompanying drawings.

DETAILED DESCRIPTION OF THE PREFERRED EMBODIMENTS

Figure 1:
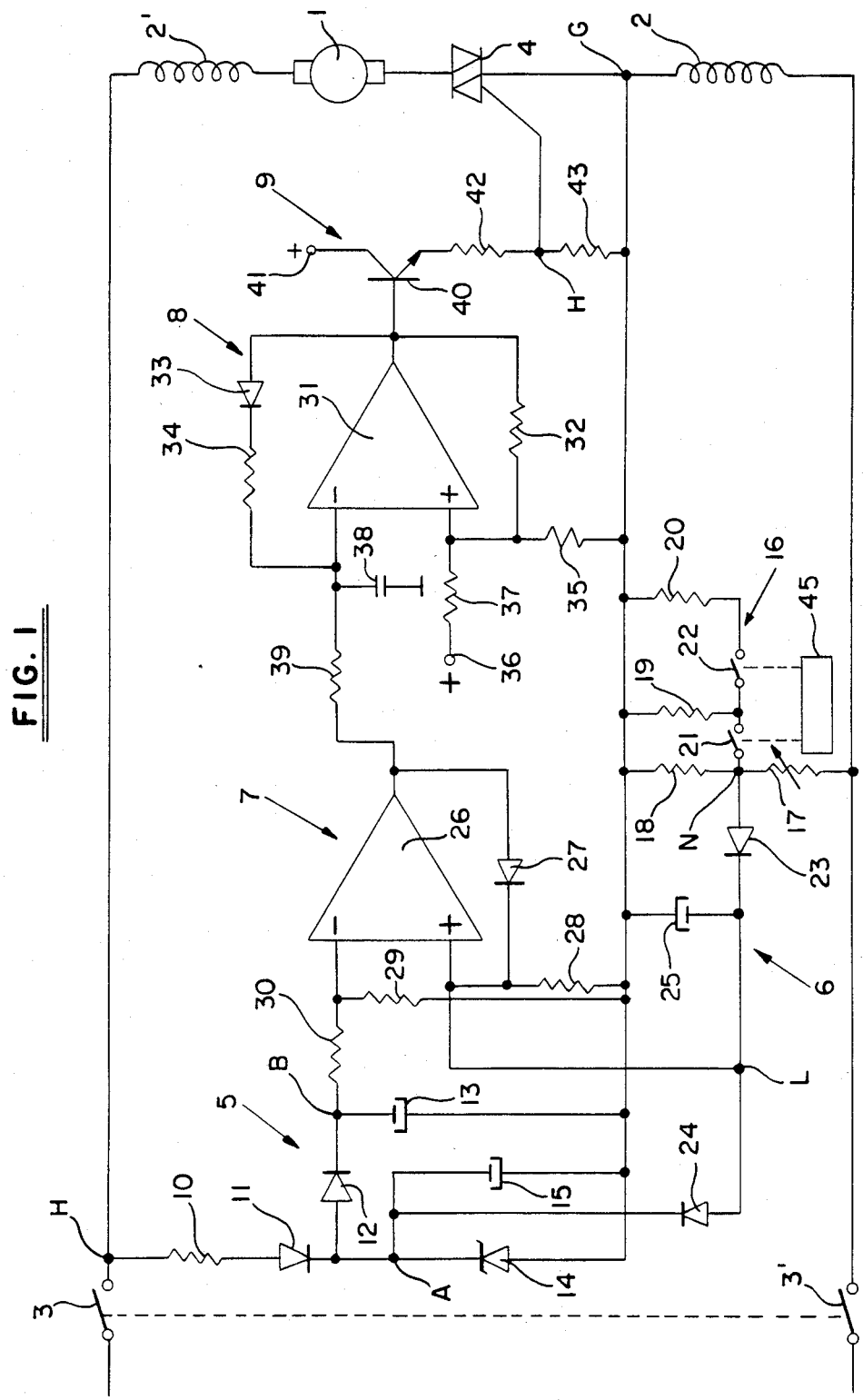
FIG. 1 is a simplified electrical schematic diagram of a first embodiment of the electronic clutch according to the invention.

With reference to FIG. 1, an electric motor 1 of single-phase commutator type with stator coils 2, 2' is supplied electrically by way of a double contact main switch 3, 3' connected to a source of AC supply voltage. The power supply to the motor 1 is controlled by a triac 4, of which the control electrode is controlled by an electronic control circuit formed substantially by a reference voltage supply unit 5, a voltage sensor 6, a comparator 7, an oscillator 8 and a power circuit 9.

The reference voltage supply unit 5 comprises a resistor 10 and two diodes 11 and 12 connected in series between an input H disposed downstream of the main switch contact 3 and an output B, which itself is connected to a point G between the triac 4 and the closer stator coil 2 by way of a capacitor 13. A zener diode 14 is connected in parallel with a capacitor 15 and is disposed between the point G and an intermediate point A between the two diodes 11 and 12.

The voltage sensor 6 comprises a voltage divider 16 connected in parallel with the stator coil 2 and formed by a variable resistor 17 in series with a plurality of parallel-connected resistors 18, 19 and 20 (or more), all of which can be cut in or out (with the exception of the first) by means of respective electrical contacts 21 and 22 (or more) controlled by the tool's speed change device 45. The speed change device 45 is schematically shown as a box and may be of any known type and construction. The movable contacts 21, 22 are mechanically coupled to the device 45 as indicated by broken lines. A diode 23 connects the central node N of the voltage divider 16 to the points A and G by way of a further diode 24 and capacitor 25, respectively. This stage converts the A.C. voltage across the stator coil 2, which is proportional to the absorbed current and temperature, to a D.C. voltage, the value of which is proportional to said A.C. voltage across the coil 2 and also depends on the temperature thereof.

The comparator 7 comprises substantially an operational amplifier 26 provided with a feedback diode 27, and input bias resistors 28 and 29. The positive input of the operational amplifier 26 is directly connected to the output L of the voltage sensor 6, and its negative input is connected to the output B of the reference voltage supply unit 5 by way of a resistor 30.

The oscillator 8, of the blockable oscillation type and having a 10% positive duty cycle, comprises an operational amplifier 31 provided with a feedback resistor 32 towards the positive input, and a diode 33 and resistor 34 connected in series, to provide feedback towards the negative input. The positive input is biased by a resistor 35, and is also connected to a positive terminal 36 (itself connected to the output B of the supply unit 5) by a resistor 37. The negative input is connected to earth by a capacitor 38, and to the output of the comparator 7 by a resistor 39.

Finally, the power circuit 9 comprises an NPN transistor 40, of which the collector is connected to a positive terminal 41 (itself connected to point A of the supply unit 5), the base is connected directly to the output of the oscillator 8, and the emitter is connected to point G by two resistors 42 and 43 in series. An intermediate point H between the resistors 42 and 43 is connected to the control electrode of the triac 4.

When in operation, the voltage sensor 6 normally feeds to the positive input of the comparator 7 a voltage signal lower than the reference voltage present at the negative input of the comparator 7; so that the output of the comparator 7 is zero, and keeps the oscillator 8 freely oscillating (for example at 1 KHz). The pulses from the oscillator 8 periodically switch the transistor 40 of the power circuit 9 to the conducting state, so that the power circuit 9 feeds periodic voltage peaks to the control electrode (gate) of the triac 4. As the frequency of these peaks is not synchronous with the mains frequency, and is in fact much higher than the latter, the triac 4 can be considered as fully conducting, and the motor 1 to be electrically supplied. However, when as the result of a particularly high torque applied to the armature shaft of the motor 1, the A.C. voltage across the stator coil 2 exceeds a predetermined value determined by the voltage divider 16, the output of the sensor 6 rises, after a predetermined lag time which can be fixed by the capacitor 25, to a level exceeding the reference level fixed by the supply unit 5, so that a positive voltage appears at the output of the comparator 7 and has the effect of blocking the oscillation of the oscillator 8. The transistor 40 of the power circuit 9 consequently becomes blocked, and the triac 4 is extinguished, so halting power supply to the motor 1. The motor consequently stops.

As stated, the level of operation of the electronic clutch is determined by the voltage divider 16, which fixes the proportionality constant between the A.C. voltage across the coil 2 (which itself depends on the temperature of the motor 1) and the output voltage available at the sensor output L. After being initially preset by the variable resistor 17, the said proportionality constant itself varies with the operating speed of the tool by the effect of the corresponding change of state of the contacts 21 and 22, the closure of which causes the respective resistors 19 and 20 to be connected in parallel with the resistor 18, thus correspondingly reducing the value of the equivalent resistance of the voltage divider 16.

The capacitor 25 fixes the lag time of the sensor 6, to enable the measured voltage to exceed for a short time the operating threshold of the electronic clutch without this latter operating. In this way the insensitivity time of the electronic clutch is determined in an obviously variable manner.

Figure 2:
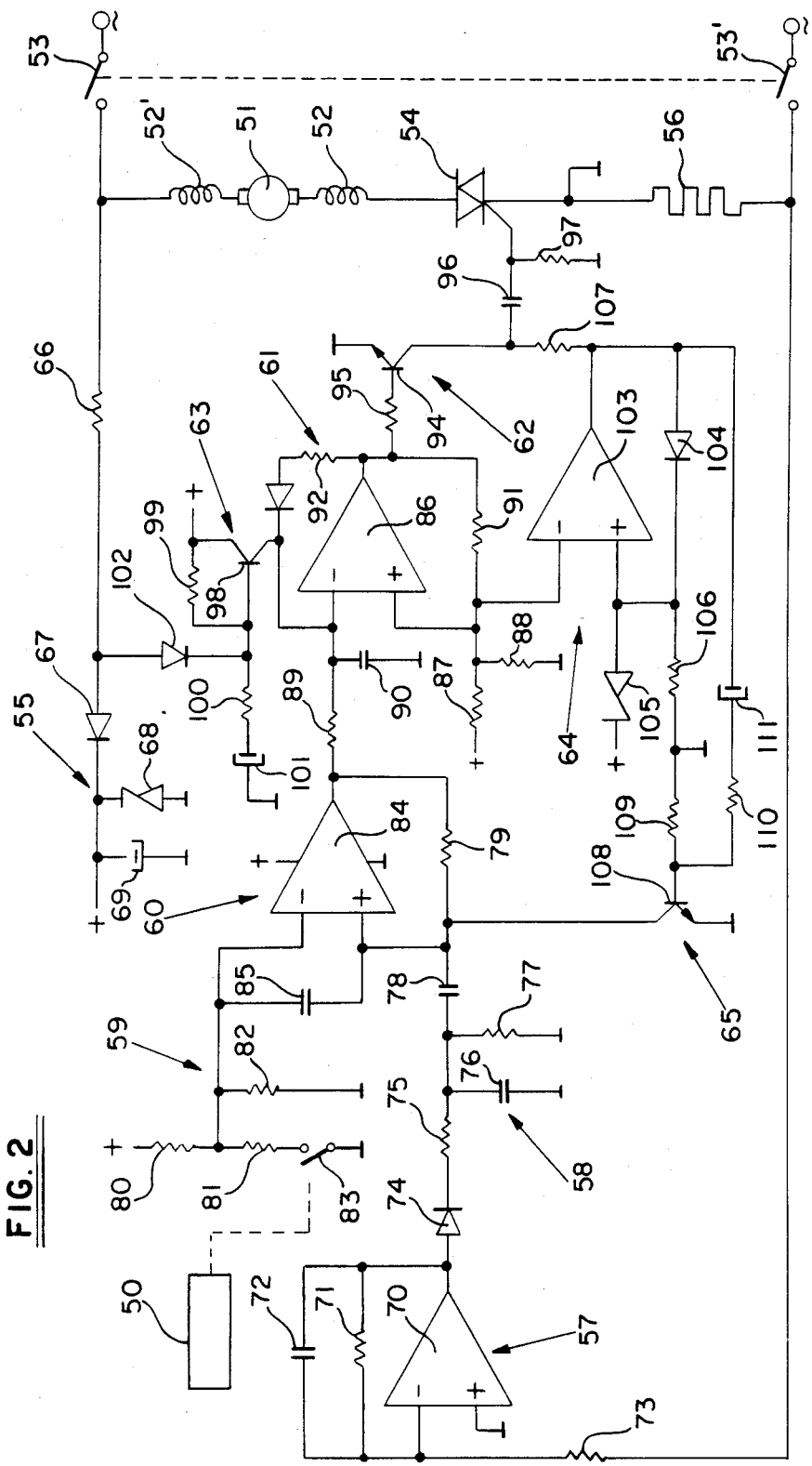
FIG. 2 is a more complete schematic diagram of a second embodiment of the electronic clutch according to the invention.

The electronic clutch illustrated in FIG. 2 is conceptually the same as that described with reference to FIG. 1. In FIG. 2 the reference numeral 51 indicates the controlled motor, 52 and 52' its stator coils, 53, 53' the two mutually coupled contacts of the main switch which supplies the alternating current from a source of A.C. supply voltage, 54 a triac for controlling the motor 51. Reference numeral 55 indicates a stabilised power supply unit which converts the supply A.C. voltage fed through the main switch into D.C. voltage, 56 a sensing resistor connected in series with the triac 54, 57 a voltage amplifier-sensor, 58 an integrating-differentiating circuit, 59 a reference voltage generator, 60 a voltage comparator, 61 an oscillator, 62 a power circuit, 63 a soft start circuit, 64 a threshold circuit for the delayed activation of the triac 54, and 65 a start inhibitor circuit. In practice, the main circuits of the electronic clutch can be said to be equivalent in the two versions of FIG. 1 and FIG. 2, except for a different operating point depending on the speed chosen for the tool, and the addition in the clutch of FIG. 2 of some auxiliary circuits such as those indicated by the reference numerals 63, 64 and 65, which can however also be incorporated into the clutch of FIG. 1.

Considering the electrical schematic diagram of FIG. 2 in greater detail, the stabilised power supply unit 55 comprises, connected in series starting from the main switch 53, a resistor 66 and a diode 67, beyond which there is a D.C. voltage available, stabilised by a Zener diode 68. In parallel with this latter there is a capacitor 69. The voltage amplifier-sensor 57 comprises an operational amplifier 70 in parallel with a resistor 71 and capacitor 72. The positive input of the amplifier 70 is connected to earth, i.e. is grounded, whereas the negative input is connected to the sensing resistor 56 via a resistor 73. The integrating-differentiating circuit 58, which is connected to the output of the amplifier 70 by a diode 74, comprises three RC groups providing integration, discharge and differentiation functions. The first group comprises a resistor 75 and capacitor 76, the second group comprises the capacitor 76 and the resistor 77, and the third group comprises a capacitor 78 and a resistor 79, the latter being in common with the comparator 60.

The reference voltage generator 59 substantially comprises a voltage divider formed from three resistors 80, 81 and 82, of which the resistor 81 can be cut in and out by a switch 83 controlled by the tool's speed change device 50.

The comparator 60 is constituted by a differential amplifier 84, of which the negative input is connected to the output of the reference voltage generator 59, and the positive input is connected to the output of the integrating-differentiating circuit 58. The resistor 79 is connected in parallel with the amplifier 84. There is also a capacitor 85 connected between the two inputs of the amplifier 84.

The oscillator 61 comprises an operational amplifier 86, of which the positive input is connected to a positive power supply by way of a resistor 87 and to earth (i.e. ground) by way of a resistor 88. Whereas the negative input is connected to the output of the comparator 60 by way of a resistor 89 and to earth by way of a capacitor 90. A resistor 91 connects the output of the amplifier 86 to said positive input, and said output is connected to the negative input by means of a resistor 92 and diode 93 connected in series.

The power circuit 62 comprises an NPN transistor 94, of which the emitter is connected to earth, the base is connected to the output of the oscillator 61 by way of a resistor 95, and the collector is connected by way of a capacitor 96 to the control electrode of the triac 54, which is itself connected to earth via a resistor 97. The soft start circuit 63 comprises a NPN transistor 98 of which the collector is connected to the negative input of the amplifier 86 of the oscillator 61, and the emitter is connected to a positive power supply and to the base by way of a resistor 99. The base of the transistor 98 is connected to earth by way of a resistor 100 and capacitor 101 in series, and to an intermediate point between the resistor 66 and the diode 67 of the power supply unit 55 by way of a diode 102.

The threshold circuit 64 comprises an operational amplifier 103 connected in parallel with a diode 104. The positive input of the amplifier 103 is connected to a positive power supply by way of a Zener diode 105 and to earth by way of a resistor 106. The negative input of amplifier 103 is connected to the positive input of the amplifier 86 of the oscillator 61. The output of the amplifier 103 is connected to the power circuit 62 by way of a resistor 107.

Finally, the inhibitor circuit 65 comprises an NPN transistor 108, of which the collector is connected to the positive input of the amplifier 84 of the comparator 60, the emitter is connected to earth, and the base is connected to earth by way of a resistor 109 and also to the output of the amplifier 103 of the threshold circuit 64 by way of a resistor 110 and capacitor 111 in series.

Under normal operating conditions the current passing through the sensing resistor 56, and thus through the windings 52 and 52' of the motor 51, is maintained at a value such that a voltage is applied through the voltage sensor 57 to the positive input of the amplifier 84 of the comparator 60 which is less than the reference voltage applied by the generator 59 to the negative input of said amplifier 84. Therefore, the output of the amplifier 84 is zero. Consequently, the oscillator 61 is free to oscillate in order to cause periodic switching on of the transistor 94, with likewise periodic triggering of the triac 54. By suitably choosing the triggering frequency, the triac 54 can be considered substantially in a state of full conduction, with likewise continuous supply to the motor 51.

If the torque applied to the motor armature shaft suddenly increases so that a danger condition arises, there is an immediate current increase which is sensed by the resistor 56, and amplified by the voltage-amplifier sensor 57. A voltage proportional to the current change is then fed by the integrating-differentiating circuit 58 to the positive input of the amplifier 84 of the comparator 60; as this voltage is greater than the reference voltage applied to the negative input of comparator 60, the latter produces a positive output which, by being fed to the negative input of the amplifier 86, blocks oscillation of the oscillator 61. The transistor 94 is then constantly blocked, extinguishing the triac 54, and thus interrupting supply to the motor 51.

The level of operation of the electronic clutch is fixed in this case by the voltage divider which constitutes the reference voltages generator 59. This is because the equivalent resistance of this voltage divider, and thus the generated reference voltage, varies according to whether the switch 83 is closed or open, and thus whether the resistor 81 is operationally included in or excluded from the voltage divider 59.

The integrating circuit, constituted by the resistor 75 and capacitor 76, determines the mean value of the peaks of the input signal originating from the output of the operational amplifier 70, in order to prevent unrequired operation of the electronic clutch caused by spurious signals, or by disturbances originating from the mains or radiation sources.

The sensitivity of the electronic clutch is determined by the time constant of the differentiating circuit formed by the capacitor 78 and the resistor 79.

The purpose of the threshold circuit 64 is to delay the triggering of the triac 54 until the instant in which the motor starts. In this respect, during this starting stage the triac triggering circuits could in fact cause the triac to operate before the supply voltage stabilises at the value necessary to enable the circuit 58 to perform its differentiating function, and thus discriminate between the starting current of the motor when unloaded and the current when the rotor is blocked (or stalled). The threshold circuit 64 keeps the triac 54 extinguished until the correct supply voltage is applied to the positive input of the amplifier 103 by way of the Zener diode 105. At that point, the output of the amplifier 103 becomes positive, and the triac is triggered.

The purpose of the soft start circuit 63 is to protect the operator should starting occur with the rotor blocked. In the initial stage, and more specifically during the entire charging transient of the RC circuit formed by the resistor 100 and capacitor 101, the conduction of the transistor 98 in fact blocks oscillation of the oscillator 61 during the negative half waves of the supply voltage; while the presence of the diode 102 blocks this transistor 98, with consequent free oscillation of the oscillator 61, during the positive half waves. Consequently, the oscillator 61 operates only during the positive half waves of the supply voltage; thus on the one hand the maximum torque which can be developed by the normal protective function which operates on the positive half waves is ensured. On termination of the transient stage, which lasts for example about 500 msec, normal operation at full power begins.

Finally, the purpose of the inhibitor circuit 65 is to prevent the current peak absorbed on motor start being interpreted by the circuit as a sudden change of state, and as such cause switching of the amplifier 84 of the comparator 60 and thus the extinguishing of the triac 54 and stoppage of the motor 51. In this respect, during the charging transient of the RC circuit formed by the capacitor 111 and resistor 110, and for a time which varies as a function of the value of the resistor 109, the transistor 108 is saturated and then becomes blocked, so allowing the differentiating circuit constituted by the capacitor 78 and resistor 79 to operate freely. The sensing of the absorbed current, or rather its variation, is thus blocked for a determined time period (for example 80–120 msec) from the instant in which the triac 54 becomes conducting.

It will be appeciated that the electronic clutches of FIGS. 1 and 2 can be incorporated in electric tools, for example portable drills, drill presses etc., which can operate at several different speeds any one of which speeds can be selected by the operator. The embodiment shown in FIG. 1 is for a three speed tool, and that shown in FIG. 2 is for a two speed tool. However, in FIG. 1 by increasing the number of resistances 18, 19, 20 in parallel and correspondingly increasing the number of contacts 21, 22, the electronic clutch can readily be adapted for an electric tool having any number of selectable speeds, e.g. four, five, six or more. Similarly, in the FIG. 2 embodiment, by having further resistances in parallel with the resistance 81 and providing each with a separate switch similar to switch 83 to selectively connect each such resistance to ground, an electric tool having three, four or more selectable speeds can be accommodated.

The above described embodiments, of course, are not to be construed as limiting the breadth of the present invention. Modifications, and other alternative constructions, will be apparent which are within the spirit and scope of the invention as defined in the appended claims.

What is claimed is:

1. An electronic clutch, for an electric tool, in combination with a motor speed change device for selecting different speeds of operation of the tool's motor, the electronic clutch comprising:

voltage sensor means for generating an output voltage proportional to the current drawn by the tool's motor;

reference voltage generator means for generating a reference voltage;

a comparator having inputs connected respectively to said voltage sensor means and said reference voltage generator means and arranged to compare said generated voltages with each other and produce an output dependent upon such comparison;

an electronic circuit to which the output of said comparator is connected and arranged to interrupt the power supply to the tool's motor when said comparator determines that the output voltage generated by said voltage sensor means exceeds said reference voltage;

a voltage varying device included in one of said means and coupled to said motor speed change device, said voltage varying device proportionally varying the voltage generated by said one of said means in accordance with the operating speed selected for the tool's motor;

a differentiating circuit connected between the output of said voltage sensor means and the respective input of said comparator;

an inhibitor circuit arranged to prevent operation of said differentiating circuit for a predetermined time at the instant the tool's motor is started; and said inhibitor circuit comprising a transistor having a collector connected to said comparator, an emitter connected to ground, and a base connected to ground via a resistor, said base also being connected via a capacitor and a resistor to said electronic circuit.

2. The electronic clutch of claim 1, wherein said voltage varying device comprises a voltage divider having at least one resistor which can be cut in and out by a switch controlled by the tool's speed change device.

3. The electronic clutch of claim 2, wherein said voltage divider is included in said reference voltage generator means.

4. An electronic clutch, for an electric tool, in combination with a motor speed change device for selecting different speeds of operation of the tool's motor, the electronic clutch comprising:

a voltage sensor unit for generating a D.C. output voltage proportional to the current drawn by the tool's motor and dependent on the motor operating temperature;

a reference voltage unit for generating a D.C. reference voltage;

one of the generated voltages being varied by the selection of the operating speed of the tool's motor;

a comparator having inputs connected to said voltage sensor unit and said reference voltage unit and arranged to compare said generated voltages with each other;

an electronic circuit connected to the output of said comparator and arranged to interrupt the power supply to the tool's motor when said comparator determines that the output voltage generated by said voltage sensor unit exceeds said reference voltage, said electronic circuit including a blockable oscillator and a triac;

a voltage divider coupled to said motor speed change device for providing an output voltage in accordance with the operating speed selected for the tool's motor, said voltage divider having at least one resistor which can be cut in and out by a switch controlled by said motor speed change device, and said voltage divider being incorporated in one of said units for proportionally varying said one of said generated voltages;

a differentiating circuit disposed at the output of said voltage sensor unit;

an inhibitor circuit arranged to prevent operation of said differentiating circuit for a predetermined time at the instant the tool's motor is started;

a soft start circuit operational during motor starting to keep said oscillator in the blocked condition during negative half waves of an A.C. supply voltage connected to the tool;

a power circuit sensitive to blocking of said oscillator and being connected between the output of said oscillator and the control electrode of said triac; and a threshold circuit which acts on said power circuit to delay triggering of said triac for a predetermined time at the instant the tool's motor is started.

5. The electronic clutch of claim 4, wherein said voltage divider is included in said reference voltage generator.

* * * * *